United States Patent [19]
Fuhrmann

[11] 3,974,862
[45] Aug. 17, 1976

[54] FLEXIBLE CONDUIT

[75] Inventor: Siegfried Führmann, Gleidingen, Germany

[73] Assignee: Kabel-und Metallwerke Gutehoffnungshutte Aktiengesellschaft, Hannover, Germany

[22] Filed: Apr. 28, 1975

[21] Appl. No.: 571,933

[30] Foreign Application Priority Data
May 15, 1974 Germany.................... 7417030[U]

[52] U.S. Cl................................ 138/37; 138/39; 138/114; 138/103
[51] Int. Cl.².................. F15D 0/00; F16L 11/00; F16L 9/18
[58] Field of Search................ 138/37, 39, 42, 44, 138/106, 109, 112, 113, 121, 122, 114, 148, 155, 103; 165/154–156, 184

[56] References Cited
UNITED STATES PATENTS

| | | | |
|---|---|---|---|
| 2,908,486 | 10/1959 | Thornburg..................... | 165/156 X |
| 3,219,368 | 11/1965 | Crumpler...................... | 138/103 X |
| 3,730,229 | 5/1973 | D'Onofrio........................ | 138/114 |

*Primary Examiner*—Richard E. Aegerter
*Assistant Examiner*—Larry Jones
*Attorney, Agent, or Firm*—Ralf H. Siegemund

[57] ABSTRACT

An outer tube is corrugated helically or annularly and an inner, uncorrugated tube has axially and radially outwardly extending ribs engaging inwardly directed corrugation crests of the outer tube. Part of a fluid flow is diverted into the space between the tubes.

6 Claims, 2 Drawing Figures

FLEXIBLE CONDUIT

BACKGROUND OF THE INVENTION

The present invention relates to a flexible conduit assembly for the conduction of fluids and more particularly the invention relates to a tube system with an outer, corrugated tube and an inner, also flexible tube whereby the space between the tubes is also available for the conduction of fluid.

Fluids are often to be conducted through a flexible tubing. It was observed, however, that corrugated tubes may undergo longitudinal oscillations particularly for velocities of the fluid above some value. That wave depends on the corrugation contour. Such oscillations may readily lead to damage of the tube.

A known tube system (German printed patent application 1,935,191) is constructed from a helically corrugated, outer tube having connecting pieces at both ends, and a flexible tube or sleeve is situated on the inside of the corrugated tube and in such a manner that the inwardly oriented corrugation crests of the outer tube engage the outer surface of the inner tube. The inner tube serves as conduit proper but some of the flow is diverted into the helical duct as defined by the outwardly oriented corrugation crests of the outer tube and the inner tube. This particular secondary flow path is a continuous one, without exhibiting any pockets or the like in which precipitates or other additives could accumulate. Also, this helical secondary flow path envelopes the inner tube in a uniform manner and provides for thermal as well as noise insulation. However, it must be observed that flow dynamically the helical conduit is only of limited usefulness; such an assembly cannot be made too long, as otherwise insufficient amounts of fluid will be driven through that helical channel, and the entire flow therethrough with more and more stagnate.

DESCRIPTION OF THE INVENTION

It is an object of the present invention to provide for a new and improved flexible tube assembly with inner and intermediate (outer as to an inner tube) flow space.

In accordance with the preferred embodiment of the present invention, it is suggested to provide an outer tube with helical or annular corrugations and an inner tube with at least approximately longitudinally (i.e., axially) extending ridges or ribs, whereby the outer edges of these ridges engage the inwardly directed corrugation crests of the outer tube. The flow space on the outside of the inner tube is, therefor, a combined axial-helical or annular fluid path with little pressure loss. Such an assembly can be used in great lengths whereby the ridges or ribs strengthen and stiffen the assembly without, however, rendering the assembly inflexible.

The height of the ridges or ribs should be at least 5% of the inner diameter of the outer tube, and the inner tube should be provided with at least three ridges. The inner tube should be provided with at least one entrance piece which widens conically towards the inner tube to which it is connected and serves as a scoop to guide some fluid into the space between the two tubes.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
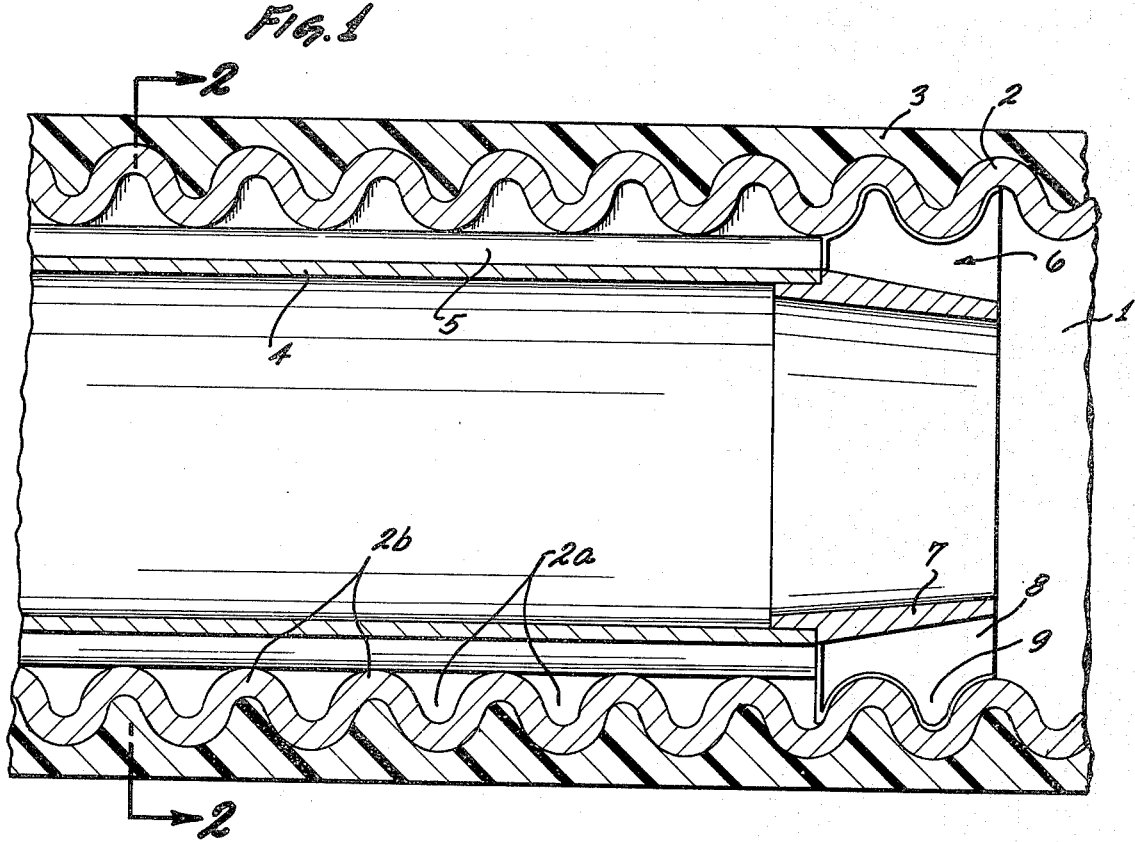
FIG. 1 is a longitudinal section view through a conduit system in accordance with the preferred embodiment of the invention.
Figure 2:
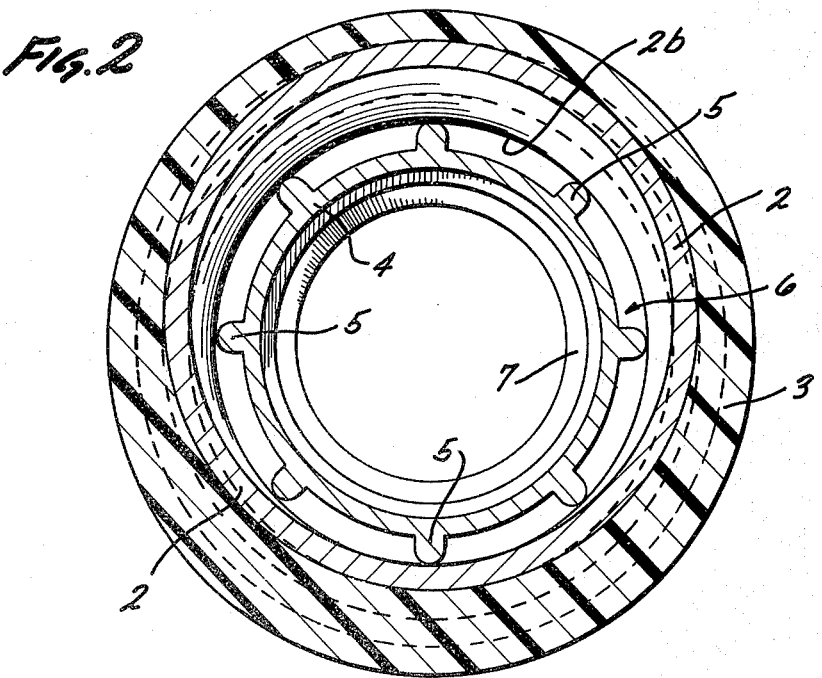
FIG. 2 is a section view along lines 2—2 of FIG. 1.

Proceeding now to the detailed description of the drawings, the Figures show a flexible conduit assembly 1 which includes a thin wall, flexible corrugated tube 2 made of metal. The corrugations are helical or annular so that the outwardly extending crests establish a helical duct or multiple ring ducts 2a. The tube 2 is enveloped on the outside by a plastic jacket 3 to provide for reinforcing protection and prevent corrosion. The jacket 3 may consist, for example, of polyethylene.

A sleeve or inner tube 4 is situated on the inside of tube 2 in concentric relation thereto. Tube 4 is made of plastic such as polyethylene or polyvinylchloride. Tube 4 is provided with radially outwardly extending ribs or ridges 5 which run parallel to the tube's axis. However, the ridges 5 could have a slight pitch and helical configuration. Essential is, that the pitch is different from the pitch of the helical corrugation of tube 2 so that the ridge 5 extends transversely, at a relatively steep angle to these corrugation crest or crests 2b.

Since the ribs or ridges 5 are preferably integral with sleeve 4 and made of the same material they stiffen the tube 4 to some extent without, however, destroying the flexibility as such. The primary function of the ridges is to enlarge the flow space between tubes 2 and 4.

It can readily be seen that the resulting flow space 6 between tubes 1 and 2 has an axial duct system as defined between ribs 5. If the corrugations are helical, then duct 2a will also be for example a helical channel permitting flow with an axial component through predominately annular. As stated, the corrugations of tube 2 could be annular in which case the corrugation ducts 2a may not contribute as such to the flow through space 6 except that they define alternating constrictions. If the overall flow speed is not too high, annular corrugations should be used only when the fluid will not precipitate any components but could stagnate without deteriorating or deteriorating the flow conditions.

A mouth piece or end connector 7 is inserted in the end of tube 4 and for example glued or otherwise bonded thereto. The piece 7 has conical configuration, the narrower end pointing axially away from tube 4. This end piece 7 has also outwardly extending ridges 8 which, however, have an outer edge 9 matching the corrugation profile of tube 2. The piece 7 can be threaded into the tube 2 prior to fastening to tube 4. Thereafter, the end piece 7 fixes the position of tube 4 radially as well as axially. Of course, such threading insertion requires the corrugations to be helical.

The conical contour of end piece 7 prevents formation of eddies of entering or leaving fluid and, at the entrance, serves as an effective scoop to cause some of the fluid to be diverted into gap 6. Thus, the flow arriving in tube 2 is divided in two portions, one continuing inside of tube 4, the other one flowing to the axial-helical duct 6. Since this outer duct 6 offers some greater resistance to flow the velocity will be smaller than in the main stream in tube 4.

As was mentioned above, it has been observed that corrugated tubes generally may undergo longitudinal oscillations for velocities above a critical one which depends on the corrugation contour. Such oscillations and vibrations limit the life of the tubes. The construction of the invention reduces the flow velocity in and along the corrugations, while the central flow in tube 4 can be very high. This way then oscillations are avoided, even if the flow velocities in tube 4 are such a corrugated tube would oscillate.

The assembly can be constructed as follows. Tubing 4 with integral ribs 5 may, for example, result from extrusion, conceivably in endless fashion by a worm screw extruder or the like. Following stabilization, a metal strip is longitudinally folded around that ribbed tube, but at a larger diameter than the diameter of the circle as defined by the outer edges of the ribs. The strip is then seam welded along the adjoining edges. The thus made outer tube is corrugated whereby the tube 4 is positioned firmly inside of the corrugated tube. If necessary, the jacket 3 may be extruded or otherwise placed onto that assembly.

It can thus be seen, that the tube assembly of the type shown can be made in, basically, endless fashion and since it is flexible as a whole it can be wound on drums, or the like. The end connectors or pieces 7 will be connected wherever needed. The ribs 8 of these connectors are threaded into the corrugation when helical and the wide end of piece 7 can be glued to tube 4. This connection holds tube 4 axially as well as azimuthally as the protrusions of ribs 8 hold the tube 4 against axial displacement. Any azimuthal displacement would result in axial advance due to the threading action of the corrugations in which the ribs 8 are inserted, so that indeed tube 7 is held in position.

The tube and conduit assembly can be used as internal tubing in a larger tube assembly. The specific jacket 3 will then be omitted and replaced for example by a heat insulating foam which is located between tube 2 and a still outer tube, not shown. Alternatively (and again layer 3 may be omitted in that case) tube 2 may be encased in another tube (not shown) and held therein by a spacer, the space between the tubes being otherwise evacuated and monitored as to any leak. In all these or other cases, applications, and uses, one obtains improved flow conditions by this combination of corrugated with uncorrugated but ribbed tube.

The invention is not limited to the embodiments described above but all changes and modifications thereof not constituting departures from the spirit and scope of the invention are intended to be included.

I claim:

1. Conduit assembly for the conduction of fluids and including an inner and an outer tube, the outer tube being helically or annularly corrugated having alternatingly inwardly and outwardly extending corrugation crest, whereby each corrugation crest on the inside is a corrugation valley on the outside, the improvement comprising:

the inner tube being flexible and without corrugations, the inner tube having ribs extending in radially outward direction and engaging the inwardly extending corrugation crests of the said outer tube, said ribs running predominantly or exclusively in longitudinally axial direction, thereby extending transversely to said corrugation crest, so that fluid can flow in axial direction along the outside of the inner tube, across the corrugation crests.

2. Assembly as in claim 1 wherein the inner tube has at least three ribs.

3. Assembly as in claim 1 wherein the ribs have a height which is at least 5% of the inner diameter of the outer tube.

4. Assembly as in claim 1 and including a conical entrance piece on at least one end of the assembly and connected with its wider diameter end to the inner sleeve, the narrower end serving as scoop to divert part of a medium into space between the two tubes.

5. Assembly as in claim 4, the said piece having ridges of an outer contour matching the corrugation contour of the outer tube.

6. Assembly as in claim 1 wherein the ribs are integral with the inner tube due to extrusion of the latter as a ribbed profile.

* * * * *